(12) United States Patent
Chen et al.

(10) Patent No.: US 11,747,648 B2
(45) Date of Patent: Sep. 5, 2023

(54) HINGE AND SMART WEARABLE DEVICE WITH THE SAME

(71) Applicant: Quanta Computer Inc., Taoyuan (TW)

(72) Inventors: Chun-Lung Chen, Taoyuan (TW);
Wen-Pei Chen, Taoyuan (TW);
Chia-Hui Wu, Taoyuan (TW);
Chia-Wen Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 389 days.

(21) Appl. No.: 17/140,866

(22) Filed: Jan. 4, 2021

(65) Prior Publication Data
US 2022/0082857 A1 Mar. 17, 2022

(30) Foreign Application Priority Data
Sep. 14, 2020 (TW) ................................. 109212011

(51) Int. Cl.
*G02C 5/22* (2006.01)
*G02B 27/01* (2006.01)

(52) U.S. Cl.
CPC ............. *G02C 5/22* (2013.01); *G02B 27/017* (2013.01); *G02B 2027/0178* (2013.01)

(58) Field of Classification Search
CPC ................... G02C 5/2254; G02C 5/22; G02B 2027/0178; G02B 27/017
See application file for complete search history.

(56) References Cited

U.S. PATENT DOCUMENTS 8,827,444 B1* 9/2014 Koo ...................... G02C 5/2254
351/111
2019/0293969 A1* 9/2019 Clopp ...................... G02C 5/22

\* cited by examiner

*Primary Examiner* — Matthew A Eason
*Assistant Examiner* — Chayce R Bibbee
(74) *Attorney, Agent, or Firm* — McClure, Qualey & Rodack, LLP

(57) ABSTRACT

A hinge is provided. The hinge includes a first connection element, a second connection element, a first elastic element, and a second elastic element. The second connection element is connected to the first connection element. The first elastic element is connected to the first connection element. The second elastic element is connected to the first elastic element. The first elastic element drives the second elastic element to rotate relative to the second connection element. The first elastic element is rotatable between a first limit position and a second limit position. When the first elastic element is in the first limit position, the second elastic element is compressed.

20 Claims, 10 Drawing Sheets

HINGE AND SMART WEARABLE DEVICE WITH THE SAME

CROSS-REFERENCE TO RELATED APPLICATIONS

This application claims the benefit of Taiwan Utility Model Patent Application No. 109212011, filed on Sep. 14, 2020, the entirety of which is incorporated by reference herein.

BACKGROUND OF THE INVENTION

Field of the Invention

The present invention relates to a hinge, especially relates to a hinge that may be applied to a smart wearable device.

Description of the Related Art

As technology has developed, smart wearable devices (such as smart glasses) become popular. Techniques such as virtual reality (VR) and augmented reality (AR) may be applied to smart wearable devices.

The head breadth (which may also be referred to as head width) of people varies. When a user wears a smart wearable device, the user usually has to adjust the smart wearable device to match his or her own head breadth. However, current smart wearable devices may be too tight or too loose and thus cause inconvenience or discomfort to the user. Therefore, how to adjust the smart wearable device in order to match the user's head breadth is crucial.

Furthermore, current smart wearable devices normally cannot be folded, so that storing them is not convenient, and they are not easily portable. Therefore, how to store smart wearable devices is also a topic worth exploring.

BRIEF SUMMARY OF THE INVENTION

According to some embodiments, a hinge is provided. The hinge includes a first connection element, a second connection element, a first elastic element, and a second elastic element. The second connection element is connected to the first connection element. The first elastic element is connected to the first connection element. The second elastic element is connected to the first elastic element. The first elastic element drives the second elastic element to rotate relative to the second connection element. The first elastic element is rotatable between a first limit position and a second limit position. When the first elastic element is in the first limit position, the second elastic element is compressed.

According to some embodiments, a smart wearable device is provided. The smart wearable device includes a body, an arm, and a hinge. The hinge includes a first connection element, a second connection element, a first elastic element, and a second elastic element. The first connection element is disposed on the arm. The second connection element is disposed on the body. The first elastic element is connected to the first connection element. The second elastic element is connected to the first elastic element. The arm is rotatable toward and away from a central point of the body via the hinge.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

In the specification, terms such as "about" in conjunction with a specific value are to be interpreted so as not to exclude insignificant deviation from the specified value and may include deviations of up to, for example, 20%, preferably, 10%, more preferably, 5%. Additionally, the specific value, amount, and the like described herein are approximate. That is, without further explanation, the specific value, amount, and the like may be interpreted as "about".

Figure 1:
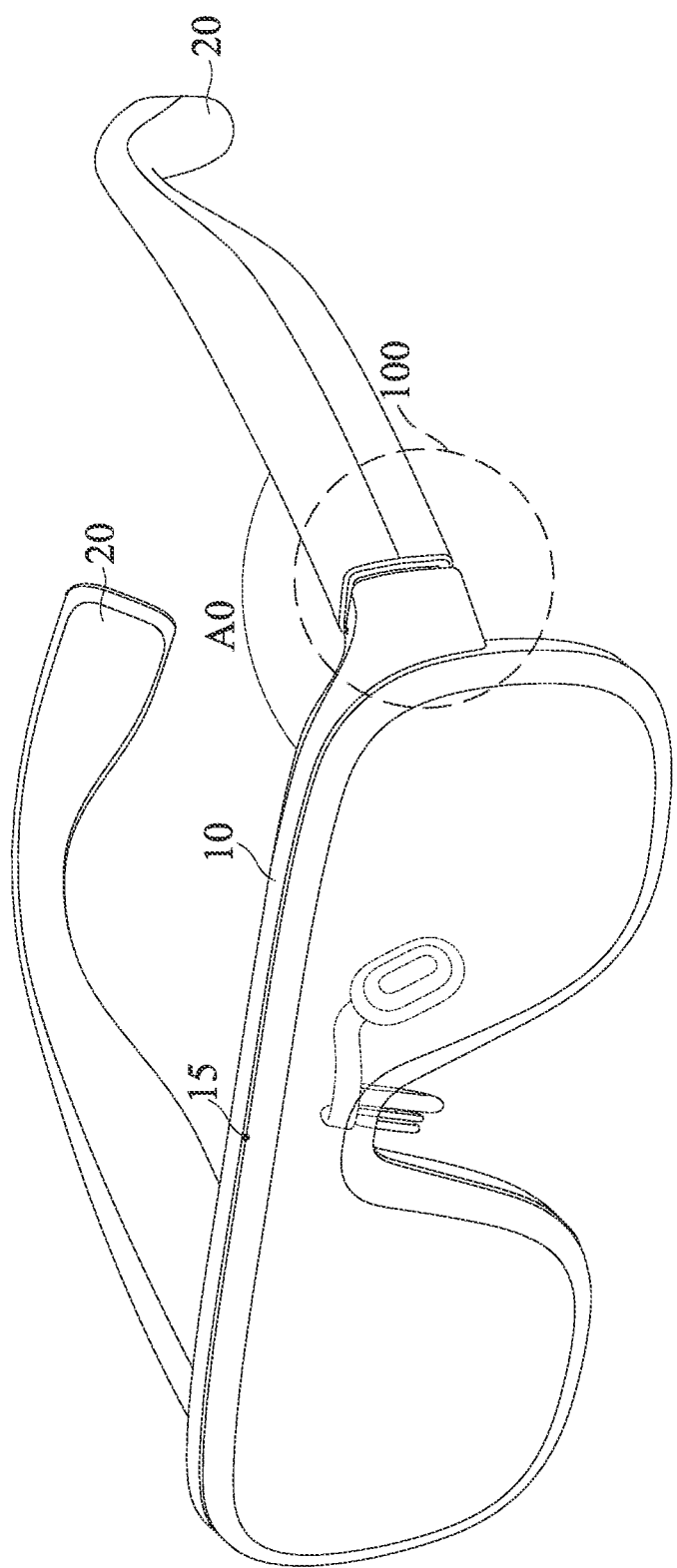
FIG. 1 is a perspective view of the smart wearable device.

Please refer to FIG. 1. FIG. 1 is a perspective view of a smart wearable device 1. The smart wearable device 1 may be smart glasses, such as VR glasses or AR glasses. The smart wearable device 1 includes a body 10, at least one arm 20 (for example, a left arm and a right arm), and a hinge 100. In FIG. 1, only the position of the hinge 100 is labeled, and the structure of the hinge 100 is not illustrated.

The body 10 may include lenses, a nose pad, etc. The body 10 includes a central point 15. When a user wears the smart wearable device 1, the body 10 is located in front of the eyes of the user, and the arm 20 is located on the side of the head of the user. With hinge 100, an angle between the arm 20 and the body 10 could be defined as a constant angle A0 if the smart wearable device 1 is not applied by an external force. Meanwhile, the smart wearable device 1 is defined as in an initial state. In order to match the head breadth of the user and/or for the convenience of storage, the user may open or close the hinge 100 to adjust the angle between the arm 20 and the body 10 of the smart wearable device 1. Therefore, the state of the smart wearable device 1 is changed. In particular, the arm 20 is rotatable relative to the body 10 via the hinge 100, such as rotatable toward the central point 15 of the body 10 and rotatable away from the central point 15 of the body 10.

Figure 2:
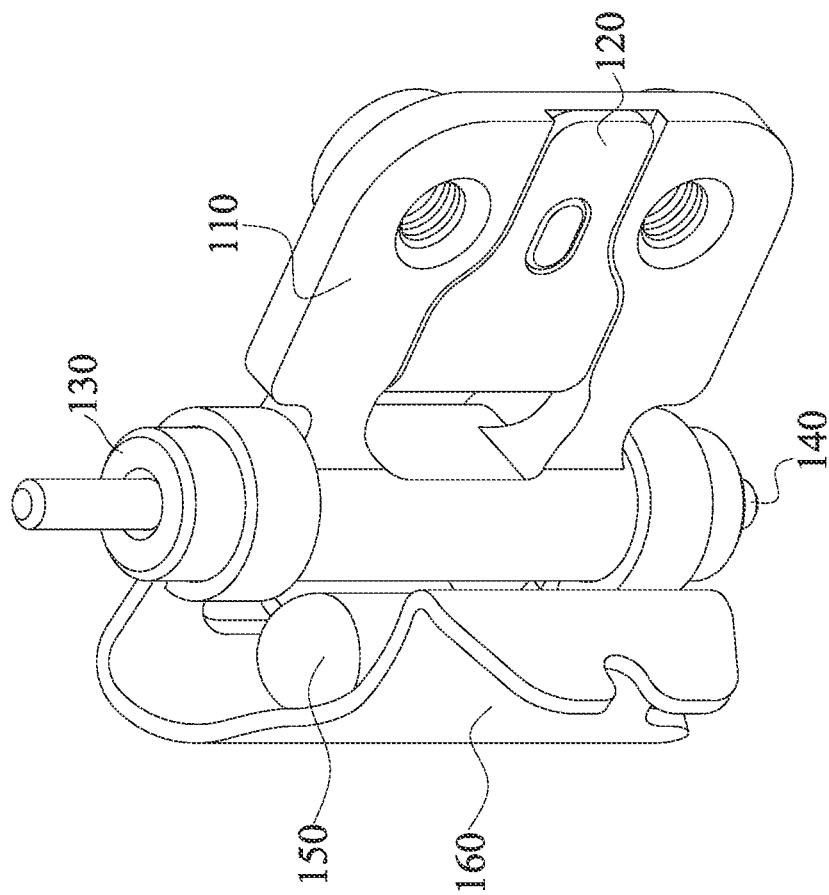
FIG. 2 is a perspective view of the hinge.
Figure 3:
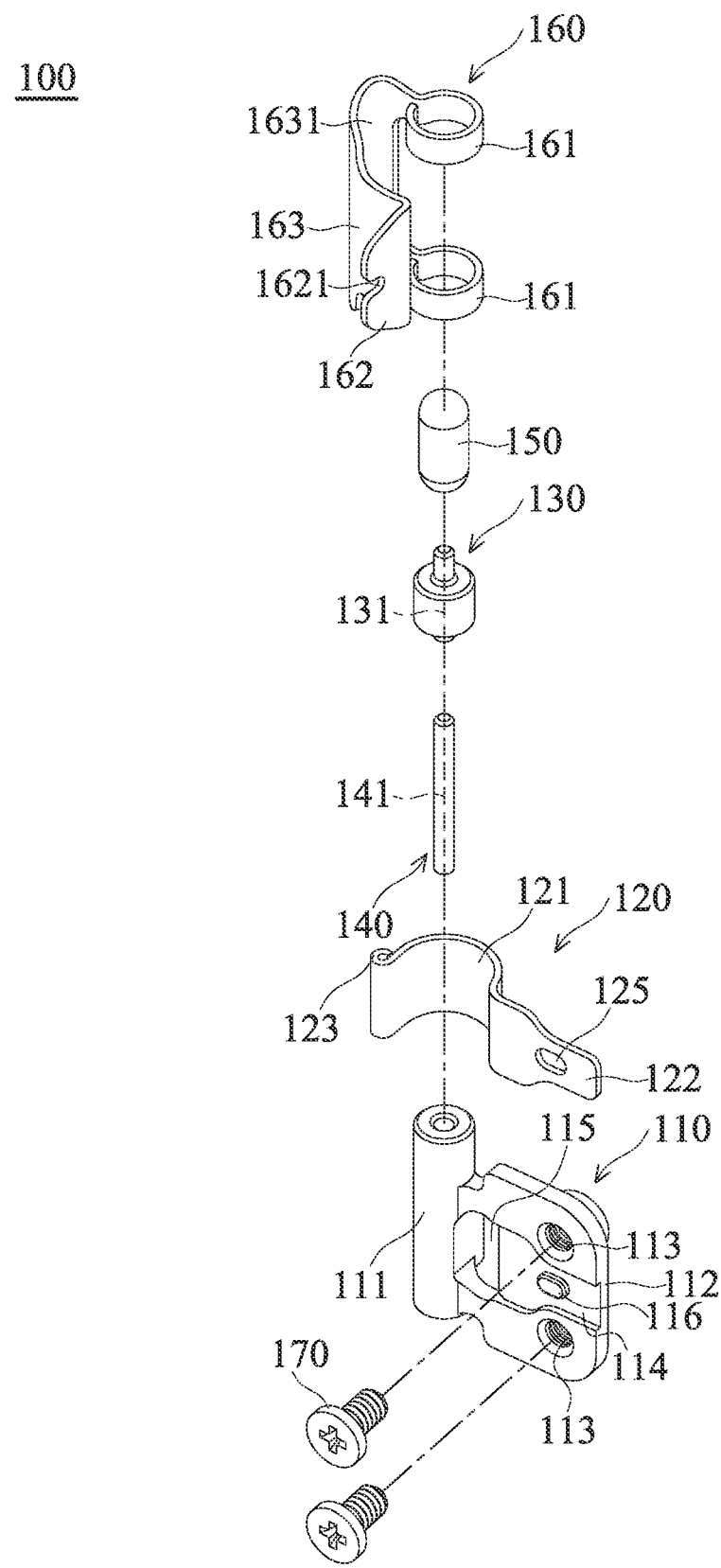
FIG. 3 is an exploded view of the hinge.

Next, please refer to FIG. 2 and FIG. 3 to understand the structure of the hinge 100. FIG. 2 is a perspective view of the hinge 100. FIG. 3 is an exploded view of the hinge 100. The hinge 100 includes a first connection element 110, a first elastic element 120, a second elastic element 150, and a second connection element 160. Due to the aforementioned elements, in the present disclosure, the first elastic element 120 may drive the second elastic element 150 to rotate relative to the second connection element 160, so that the state of the smart wearable device 1 is changed.

The first connection element 110 is disposed on the arm 20. The first connection element 110 may be made of various materials, such as metal or plastics, and the metal may be formed via a metal injection molding (MIM) process. The first connection element 110 includes a pillar 111, a connection portion 112, a connection hole 113, a receiving portion 114, a receiving opening 115, and a positioning portion 116. The pillar 111 is substantially cylinder-shaped. In some embodiments, the pillar 111 is hollow. The connection portion 112 is plate-shaped. In particular, the first connection element 110 is disposed on the arm 20 of the smart wearable device 1 via the connection portion 112. The connection hole 113 is formed on the connection portion 112, so that the first connection element 110 may be disposed on the arm 20 more stably. The receiving portion 114 is the part of the connection portion 112 that with thinner thickness, and the receiving portion 114 is substantially located on the central area of the connection portion 112. At least part of the first elastic element 120 may be received in the receiving portion 114. The receiving opening 115 is formed between the pillar 111 and the connection portion 112. The positioning portion 116 may be a protrusion. In some particular embodiments, the positioning portion 116 is located on the receiving portion 114, and the two connection holes 113 are located on opposite sides of the positioning portion 116.

The first elastic element 120 is connected to the first connection element 110. The first elastic element 120 may be made of an elastic material, such as metal. The first elastic element 120 includes a bent portion 121, an extending portion 122, a connection portion 123, and a positioning portion 125. The bent portion 121 is substantially arc-shaped, surrounding the pillar 111 of the first connection element 110. The connection portion 123 is disposed on the edge of the bent portion 121 and is connected to the second elastic element 150. The positioning portion 125 is formed on the extending portion 122. In particular, the extending portion 122 of the first elastic element 120 passes through the receiving opening 115 of the first connection element 110 and thus is disposed in the receiving portion 114 of the first connection element 110. Also, in some embodiments, the positioning portion 116 of the first connection element 110 and the positioning portion 125 of the first elastic element 120 may reach a close fit, an interference fit, etc. However, the structure and the shape of the positioning portion 116 of the first connection element 110 and the positioning portion 125 of the first elastic element 120 are not limited thereto. As long as the positioning portion 116 of the first connection element 110 and the positioning portion 125 of the first elastic element 120 are advantageous for positioning and connecting the first elastic element 120 and the first connection element 110, the circumstance falls within the scope of the present disclosure. In some embodiments, the positioning portion 116 of the first connection element 110 and the positioning portion 125 of the first elastic element 120 may be omitted. In some embodiments, other methods may be used to improve the positioning and strengthen the connection between the first elastic element 120 and the first connection element 110.

The second elastic element 150 is made of a deformable material, such as silicone, rubber, etc. The second elastic element 150 is substantially capsule-shaped. However, the second elastic element 150 may have a different shape. The second elastic element 150 is connected to the first elastic element 120. In particular, the connection portion 123 of the first elastic element 120 is located inside the second elastic element 150.

The second connection element 160 is disposed or connected to the body 10. The second connection element 160 may be made of a material that is the same as or different than the material of the first connection element 110. That is, the second connection element 160 may also be made of various materials including metal or plastics, and the metal may be formed via a metal injection molding (MIM) process. The second connection element 160 includes a receiving portion 161, a connection portion 162, and a bent portion 163. The receiving portion 161 is hollow and ring-shaped. The receiving portion 161 may receive the pillar 111 of the first connection element 110. The connection portion 162 is plate-shaped, extending from the edge of the bent portion 163. In particular, the second connection element 160 is disposed on the body 10 of the smart wearable device 1 via the connection portion 162. In some embodiments, the connection portion 162 may include a connection hole 1621. The connection hole 1621 may be formed on the edge of the connection portion 162, and the body 10 may include a structure corresponding to the connection hole 1621, so that the connection hole 1621 may be advantageous for the positioning and connection between the second connection element 160 and the body 10. The bent portion 163 is located between the receiving portion 161 and the connection portion 162. The shape of the bent portion 163 may correspond to the shape of the second elastic element 150 to be in contact with the second elastic element 150. In some embodiments, the bent portion 163 includes a closed state stop 1631.

In some embodiments, the hinge 100 further includes a fixing element 130 and a pin 140. It's probable that only part of the pillar 111 of the first connection element 110 is disposed in the receiving portion 161 of the second connection element 160, so that the fixing element 130 and/or the pin 140 may be required for positioning and fixing. For example, in this embodiment, for the convenience of assembling, the pillar 111 of the first connection element 110 only passes through the lower receiving portion 161 of the second connection element 160 but does not pass through the upper receiving portion 161 of the second connection element 160.

To prevent the first connection element 110 from dropping off from the second connection element 160 and/or to ensure the relative positions of the first connection element 110 and the second connection element 160, the fixing element 130 may be disposed in the upper receiving portion 161 of the second connection element 160 to perform positioning while the pin 140 may pass through the pillar 111 of the first connection element 110 to perform fixing. In some other embodiments, the pillar 111 of the first connection element 110 may only pass through the upper receiving portion 161 of the second connection element 160 but does not pass through the lower receiving portion 161 of the second connection element 160, and thus the fixing element 130 may be disposed in the lower receiving portion 161 of the second connection element 160. The fixing element 130 and the receiving portion 161 of the second connection element 160 may reach a close fit, an interference fit, etc. Therefore, the fixing element 130 may affix part of the first connection element 110 to part of the second connection element 160. Also, to effectively position and affix the first connection element 110 to the second connection element 160, a central axis 131 of the fixing element 130 overlaps a central axis 141 of the pin 140.

In some embodiments, the hinge 100 further includes at least one fastening element 170 (such as a screw) to affix the first connection element 110 to the arm 20 of the smart wearable device 1.

How the hinge 100 is assembled is described. The first elastic element 120 and the second elastic element 150 may be formed by an insert molding process and may be integrally formed. The first elastic element 120 is connected to the first connection element 110. The first connection element 110 is connected to the second connection element 160. The relative positions of the first connection element 110 and the second connection element 160 are ensured via the fixing element 130 and the pin 140.

Figure 4:
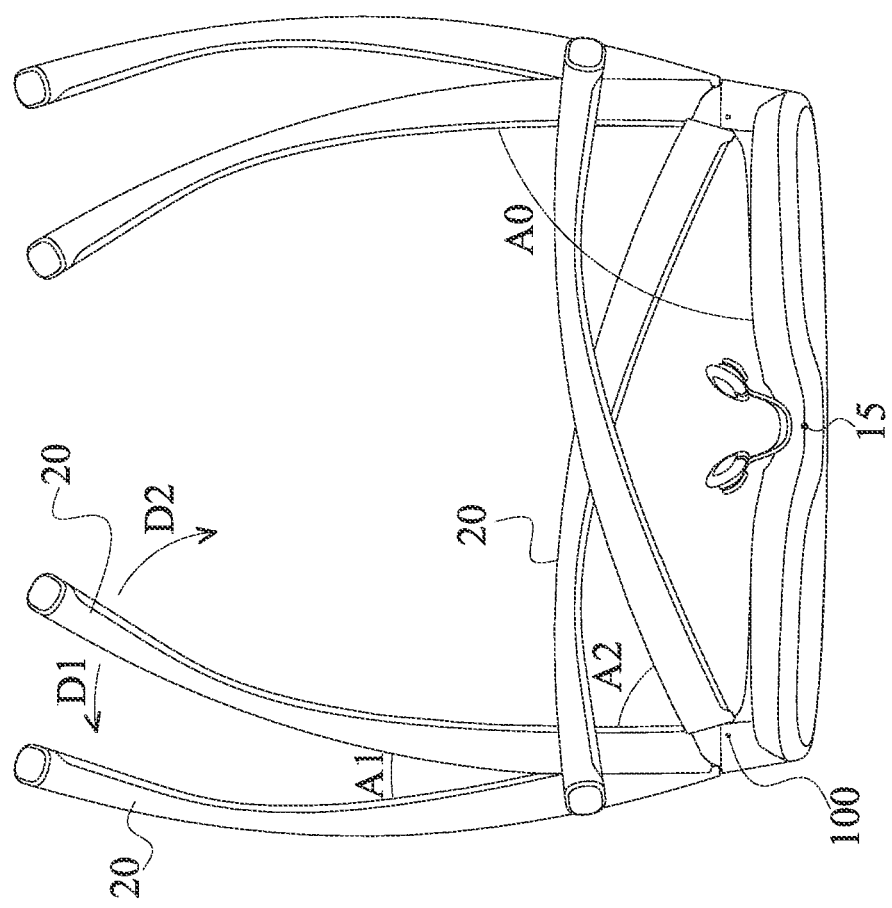
FIG. 4 is a schematic view of the smart wearable device in different states.

FIG. 4 is a schematic view of the smart wearable device 1 in different states: the initial state, a first limit state, and a second limit state. As described above, when the arm 20 of the smart wearable device 1 is in its initial state, it has not yet begun to rotate relative to the body 10 via the hinge 100, and the angle between the arm 20 and the body 10 remains constant, i.e. the constant angle A0 (see FIG. 1).

The first limit state is a state in which the smart wearable device 1 is completely open. When the smart wearable device 1 is opened, its state changes from the initial state to the first limit state, wherein the arm 20 of the smart wearable device 1 pivots around the hinge 100 and rotates away from the central point 15 of the body 10 in a direction indicated by arrow D1. The angle between the arm 20 in the initial state and the arm 20 in the first limit state is defined as an angle A1. In some embodiments, the angle A1 is between about 0° and about 30°. In some embodiments, the angle A1 is about 18°.

The second limit state is a state in which the smart wearable device 1 is completely closed. When the smart wearable device 1 is closed, its state changes from the initial state to the second limit state, wherein the arm 20 of the smart wearable device 1 pivots around the hinge 100 and rotates toward the central point 15 of the body 10 in a direction indicated by arrow D2. The angle between the arm 20 in the initial state and the arm 20 in the second limit state is defined as an angle A2. In some embodiments, the angle A2 is between about 0° and about 90°. In some embodiments, the angle A2 is about 80°.

For convenience of illustration, in FIG. 5 to FIG. 10, a plane P is shown to denote the contact surface between the connection portion 162 of the second connection element 160 and the body 10 of the smart wearable device 1.

Figure 5:
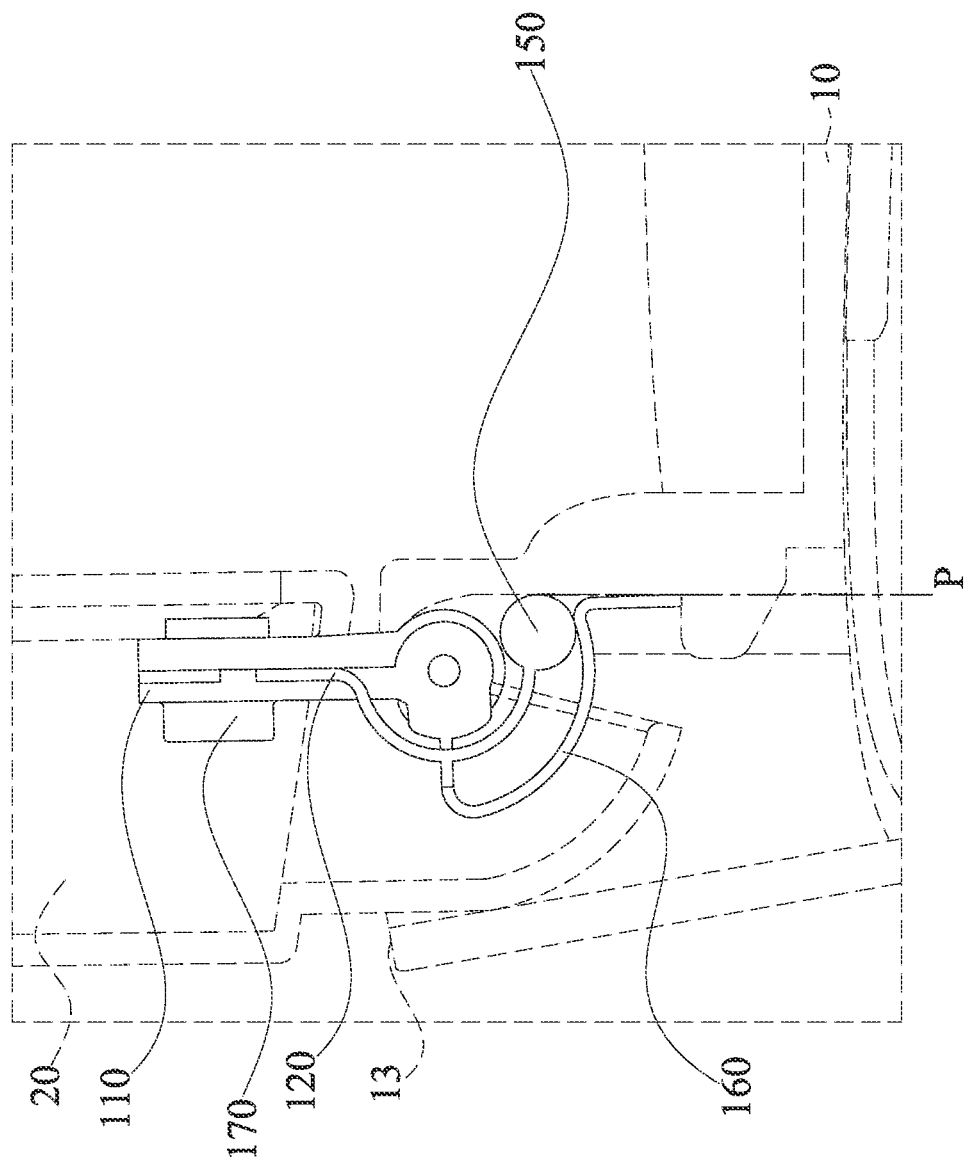
FIG. 5 is a top view of the smart wearable device and the hinge in the initial state.
Figure 6:
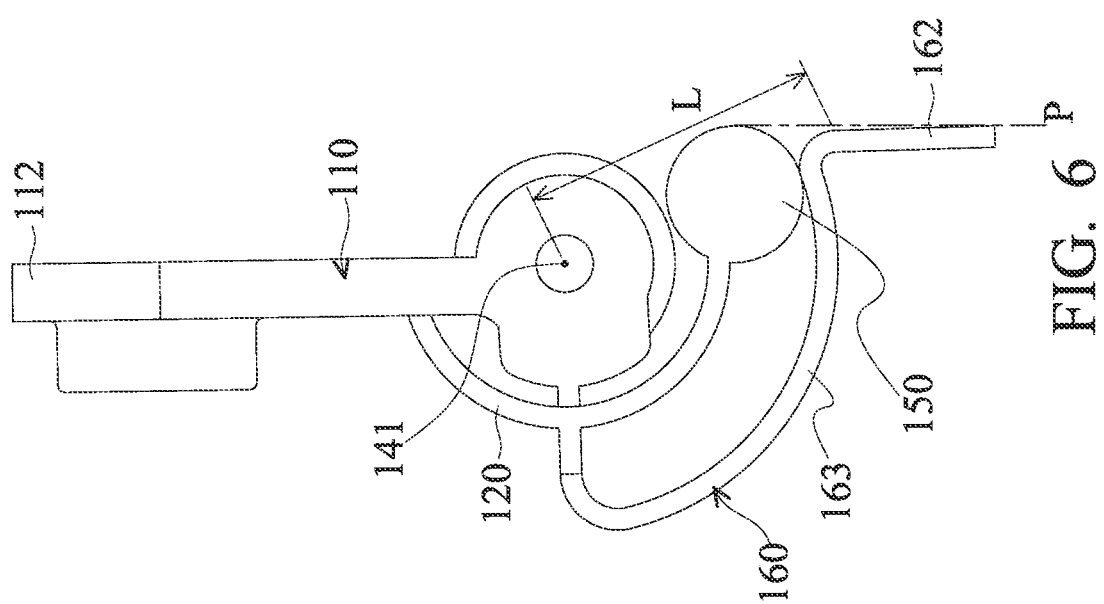
FIG. 6 is a top view of the hinge in the initial state.

FIG. 5 is a top view of the smart wearable device 1 and the hinge 100 in the initial state. FIG. 6 is a top view of the hinge 100 in the initial state. When the smart wearable device 1 is in the initial state, the position of the first elastic element 120 is defined as an initial position, the second elastic element 150 is in contact with the bent portion 163 of the second connection element 160, and the edge of the second elastic element 150 is substantially flush with the plane P.

Figure 7:
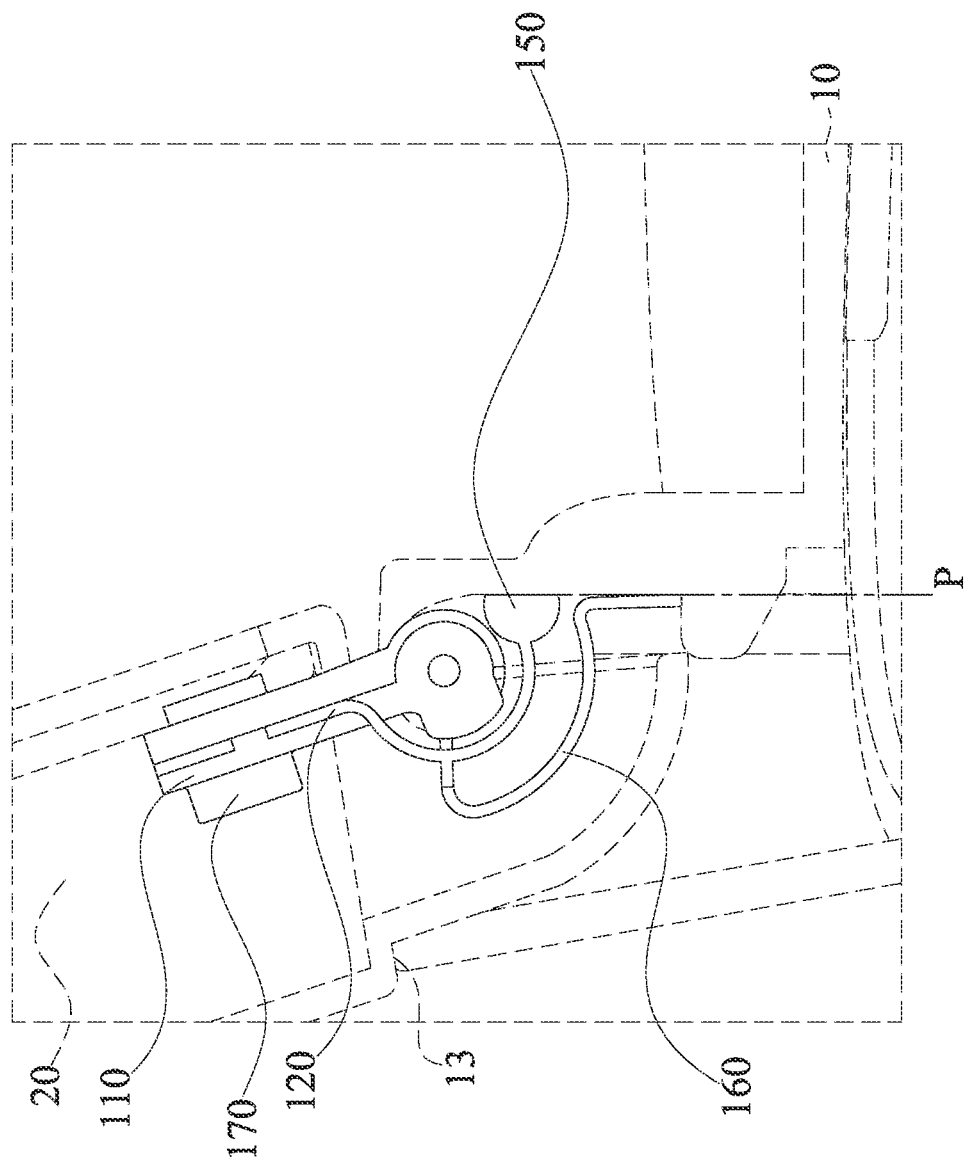
FIG. 7 is a top view of the smart wearable device and the hinge in the first limit state.
Figure 8:
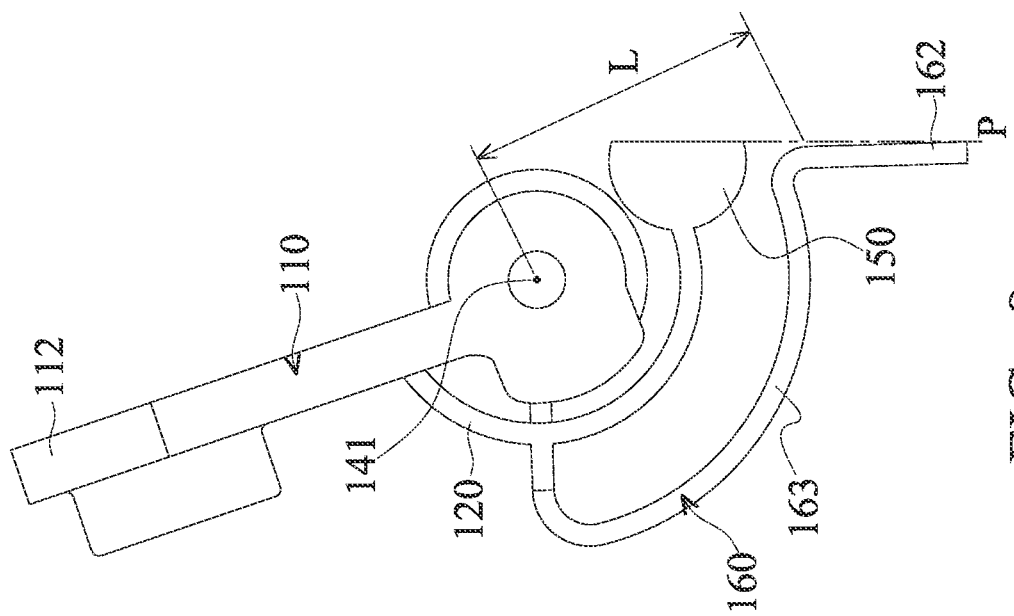
FIG. 8 is a top view of the hinge in the first limit state.

FIG. 7 is a top view of the smart wearable device 1 and the hinge 100 in the first limit state (the smart wearable device 1 and the hinge 100 completely open). FIG. 8 is a top view of the hinge 100 in the first limit state. When the smart wearable device 1 is in the first limit state, the position of the first elastic element 120 is defined as a first limit position. When the smart wearable device 1 goes from the initial state to the first limit state, i.e., the first elastic element 120 goes from its initial position to the first limit position, the second elastic element 150 is compressed due to interference with the body 10, and the first elastic element 120 may also deform to some extent.

In some embodiments, the body 10 of the smart wearable device 1 may further include an open state stop 13. When the smart wearable device 1 is in the first limit state, i.e., the first elastic element 120 is in the first limit position, the arm 20 is in contact with the open state stop 13, so that the arm 20 cannot continue rotating away from the central point 15 of the body 10. That is, the first limit position of the first elastic element 120 may be determined by the open state stop 13. If the open state stop 13 is closer to the arm 20, then the angle A1 becomes smaller. To the contrary, if the open state stop 13 is farther away from the arm 20, then the angle A1 becomes larger.

Since the smart wearable device 1 and the hinge 100 may be changed to the first limit state, the user may simply adjust the arm 20 of the smart wearable device 1 to match his or her head breadth. Not only the user experience is improved, but also the smart wearable device 1 has a wider application.

It should be noted that since the second elastic element 150 is made of an elastic material, the compressed second elastic element 150 may generate a rebound force functioning as a clamping force between the arm 20 of the smart wearable device 1 and the head of the user. Also, the elastic coefficient, the size, etc. of the second elastic element 150 may be changed to adjust the amount of the rebound force. Therefore, the user may wear the smart wearable device 1 stably and comfortably.

Figure 9:
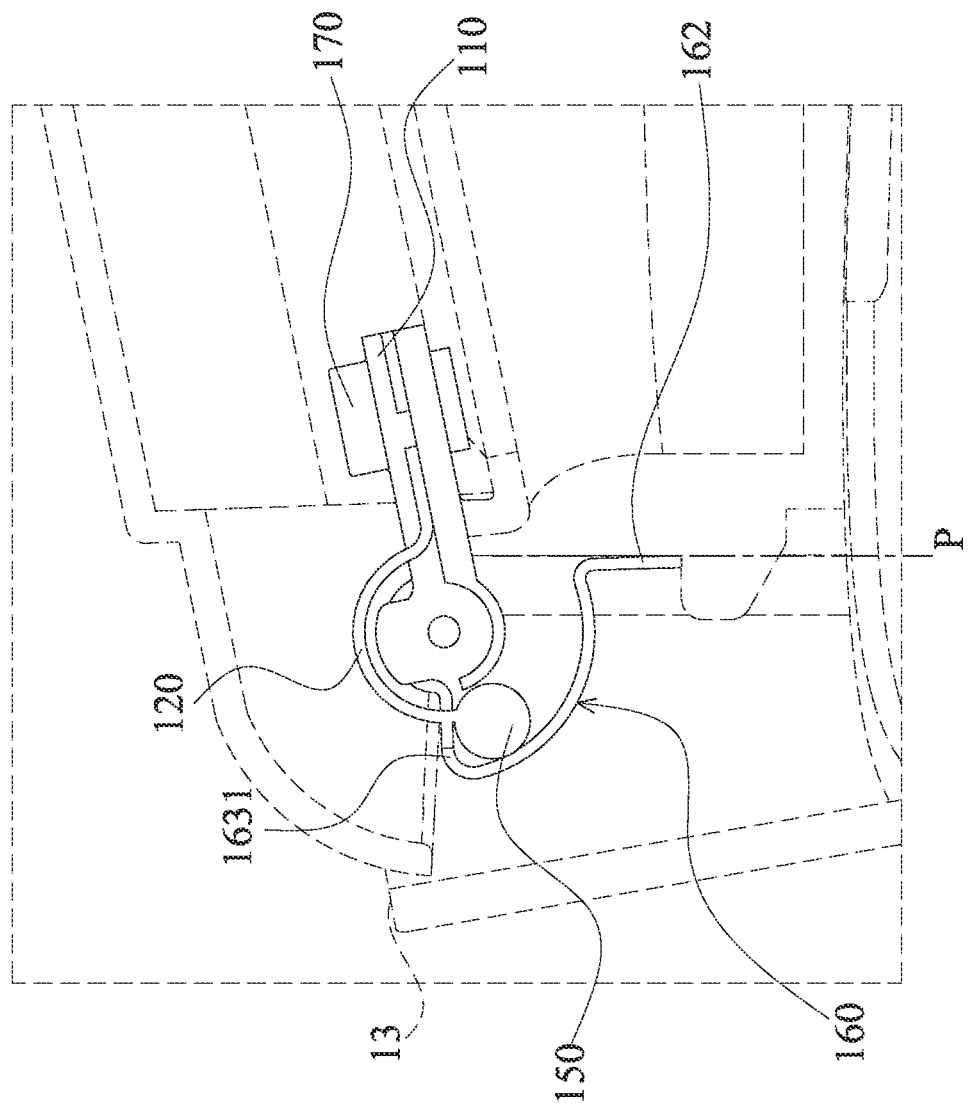
FIG. 9 is a top view of the smart wearable device and the hinge in the second limit state.
Figure 10:
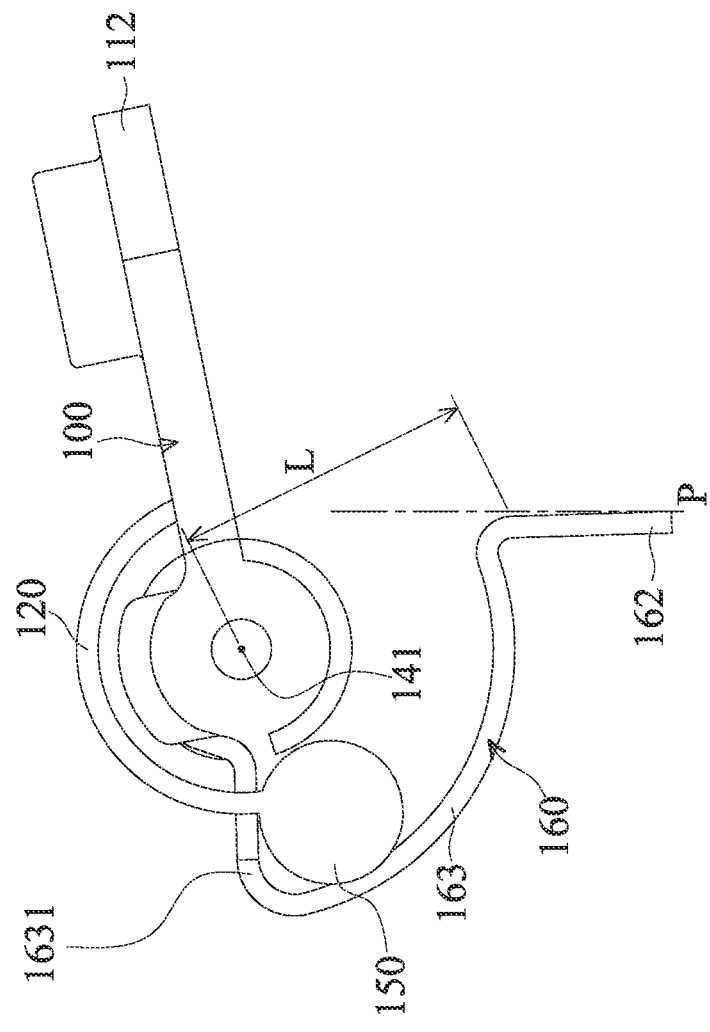
FIG. 10 is a top view of the hinge in the second limit state

FIG. 9 is a top view of the smart wearable device 1 and the hinge 100 in the second limit state (the smart wearable device 1 and the hinge 100 completely closed). FIG. 10 is a top view of the hinge 100 in the second limit state. When the smart wearable device 1 is in the second limit state, the position of the first elastic element 120 is defined as a second limit position, and the second elastic element 150 is in contact with the closed state stop 1631 of the bent portion 163 of the second connection element 160, so that the arm 20 cannot continue rotating toward the central point 15 of the body 10. That is, the second limit position of the first elastic element 120 may be determined by the closed state stop 1631.

Since the smart wearable device 1 and the hinge 100 may be changed to the second limit state, the user may simply store the smart wearable device 1 by adjusting the arm 20 of the smart wearable device 1, thereby reducing the space occupied by the smart wearable device 1. In some embodiments, the smart wearable device 1 in the second limit state may be stored in a container (such as a case that is similar to a glasses case), and thus the smart wearable device 1 is easily portable.

It should be noted that when the first elastic element 120 goes from the first limit position to the second limit position, the second elastic element 150 interferes with the second connection element 160 during the movement of the first elastic element 120. In particular, damping effects are achieved because of the interference and the friction generated between the second elastic element 150 and the bent portion 163 of the second connection element 160. Therefore, to prevent the arm 20 from moving too fast and colliding with the body 10. The design may achieve buffering, protection, and the like.

As shown in FIG. 8 and FIG. 10, when the first elastic element 120 is in the first limit position, the connection portion 112 of the first connection element 110 is located on one side of the plane P, and when the first elastic element 120 is in the second limit position, the connection portion 112 of the first connection element 110 is located on the other side of the plane P. Also, as shown in FIG. 6, FIG. 8, and FIG. 10, no matter which state the smart wearable device 1 and the hinge 100 are in, the distance L between the central axis 141 of the pin 140 and the connection portion 162 of the second connection element 160 remains the same.

As described above, the user may rotate the first connection element 110 via the arm 20, which in turns drives the first elastic element 120 connected thereto. Then, the first elastic element 120 drives the second elastic element 150 connected thereto to rotate relative to the second connection element 160. Also, the first elastic element 120 rotates between the first limit position and the second limit position, so that the smart wearable device 1 and the hinge 100 may change states.

Based on the hinge provided by the present disclosure, the smart wearable device may change states, specifically the open state and the closed state. The smart wearable device that can be opened may match the head breadth of the user and thus has a wider application. Furthermore, after the user opens the smart wearable device, the rebound force provided by the second elastic element may make the user wear the smart wearable device stably and comfortably. The smart wearable device that may be closed is convenient to store, reduces the space occupied by the smart wearable device, and is easily portable. Furthermore, when the user store the smart wearable device, the damping effects between the second elastic element and the second connection element may achieve buffering, protection, and the like.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. A hinge, comprising:
   a first connection element;
   a second connection element connected to the first connection element;
   a first elastic element connected to the first connection element; and
   a second elastic element connected to the first elastic element;
   wherein the first elastic element drives the second elastic element to rotate relative to the second connection element, the first elastic element is rotatable between a first limit position and a second limit position, and when the first elastic element is in the first limit position, the second elastic element is compressed.

2. The hinge as claimed in claim 1, wherein the second connection element comprises a closed state stop, and when the first elastic element is in the second limit position, the second elastic element is in contact with the closed state stop.

3. The hinge as claimed in claim 1, wherein during the rotation of the first elastic element from the first limit position to the second limit position, the second elastic element interferes with the second connection element.

4. The hinge as claimed in claim 1, wherein the first elastic element and the second elastic element are integrally formed.

5. The hinge as claimed in claim 1, further comprising a pin passing through the first connection element.

6. The hinge as claimed in claim 5, wherein the second connection element further comprises a connection portion, and a distance between the pin and the connection portion of the second connection portion remains the same.

7. The hinge as claimed in claim 5, further comprising a fixing element for fixing part of the first connection element to part of the second connection element.

8. The hinge as claimed in claim 7, wherein a central axis of the pin overlaps a central axis of the fixing element.

9. The hinge as claimed in claim 1, wherein the first connection element comprises a pillar, the first elastic element comprises a bent portion, and the bent portion of the first elastic element surrounds the pillar of the first connection portion.

10. The hinge as claimed in claim 9, wherein the second connection element comprises a receiving portion, the receiving portion of the second connection portion is hollow and ring-shaped, and the pillar of the first connection portion is received in the receiving portion of the second connection element.

11. The hinge as claimed in claim 1, wherein the first connection element comprises a receiving portion, the first elastic element comprises an extending portion, and the extending portion is disposed on the receiving portion of the first connection element.

12. The hinge as claimed in claim 1, wherein the second elastic element is substantially capsule-shaped.

13. A smart wearable device, comprising:
   a body;
   an arm; and
   a hinge, comprising:
      a first connection element disposed on the arm;
      a second connection element disposed on the body;
      a first elastic element connected to the first connection element; and
      a second elastic element connected to the first elastic element;
   wherein the arm is rotatable toward and away from a central point of the body via the hinge;
   wherein when the smart wearable device is not applied by an external force, the hinge is in an initial state, the arm is rotatable away from the central point of the body until the hinge is in a first limit state, and the arm is rotatable toward the central point of the body until the hinge is in a second limit state;

wherein the body comprises an open state stop, and when the hinge is in the first limit state, the arm is in contact with the open state stop, and the second elastic element is compressed.

14. The smart wearable device as claimed in claim 13, wherein the second connection element comprises a closed state stop, and when the hinge is in the second limit state, the second elastic element is in contact with the closed state stop.

15. The smart wearable device as claimed in claim 13, wherein an angle between the arm when the hinge is in the initial state and the arm when the hinge is in the first limit state is between about 0° and about 30°.

16. The smart wearable device as claimed in claim 13, wherein the angle between the arm when the hinge is in the initial state and the arm when the hinge is in the first limit state is about 18°.

17. The smart wearable device as claimed in claim 13, wherein an angle between the arm when the hinge is in the initial state and when the hinge is in the second limit state is about 80°.

18. The smart wearable device as claimed in claim 17, wherein the first connection element comprises a connection portion and a connection hole, the connection portion is plate-shaped, the connection hole is formed on the connection portion, and the first connection element is disposed on the arm via the connection portion and the connection hole.

19. A smart wearable device, comprising:
a body;
an arm; and
a hinge, comprising:
a first connection element disposed on the arm;
a second connection element disposed on the body;
a first elastic element connected to the first connection element; and
a second elastic element connected to the first elastic element;
wherein the arm is rotatable toward and away from a central point of the body via the hinge;
wherein when the smart wearable device is not applied by an external force, the hinge is in an initial state, the arm is rotatable away from the central point of the body until the hinge is in a first limit state, and an angle between the arm when the hinge is in the initial state and the arm when the hinge is in the first limit state is between about 0° and about 30°.

20. The smart wearable device as claimed in claim 19, wherein the hinge further comprises a pin passing through the first connection element.

\* \* \* \* \*